(12) United States Patent
Oue et al.

(10) Patent No.: US 9,957,073 B2
(45) Date of Patent: May 1, 2018

(54) BAG SEALING TAPE, AND BANDING DEVICE AND BANDING METHOD USING THE BAG SEALING TAPE

(71) Applicant: KYOWA LIMITED, Osaka-shi, Osaka (JP)

(72) Inventors: Hidekazu Oue, Osaka (JP); Yusuke Akiba, Osaka (JP); Tatsuya Sugiyama, Osaka (JP); Atsushi Kanda, Osaka (JP); Takaaki Tamada, Osaka (JP); Tadashi Matsumoto, Osaka (JP); Masaharu Taniguchi, Osaka (JP); Takeshi Fujii, Osaka (JP)

(73) Assignee: KYOWA LIMITED, Osaka (JP)

( * ) Notice: Subject to any disclaimer, the term of this patent is extended or adjusted under 35 U.S.C. 154(b) by 0 days. days.

(21) Appl. No.: 15/427,039

(22) Filed: Feb. 7, 2017

(65) Prior Publication Data

US 2017/0152068 A1    Jun. 1, 2017

Related U.S. Application Data

(63) Continuation of application No. 13/252,205, filed on Oct. 4, 2011, now abandoned.

(30) Foreign Application Priority Data

Oct. 4, 2010    (JP) .................................. 2010-225260

(51) Int. Cl.
*B65B 51/06*    (2006.01)
*B65B 61/06*    (2006.01)
*B65D 33/16*    (2006.01)
*C09J 121/00*    (2006.01)

(52) U.S. Cl.
CPC ............ *B65B 51/065* (2013.01); *B65B 61/06* (2013.01); *B65D 33/165* (2013.01); *C09J 121/00* (2013.01)

(58) Field of Classification Search
CPC ..... B65B 51/065; B65B 61/06; B65D 33/165; C09J 7/0246; C09J 121/00
See application file for complete search history.

(56) References Cited

U.S. PATENT DOCUMENTS

| | | | | |
|---|---|---|---|---|
| 5,389,438 A | * | 2/1995 | Miller | ..................... A61F 13/58 428/355 BL |
| 6,414,073 B1 | * | 7/2002 | Nakamura | ................. C09J 7/00 524/270 |
| 2009/0202183 A1 | * | 8/2009 | Hagino | .................... B32B 7/06 383/211 |

* cited by examiner

*Primary Examiner* — Kevin R Kruer
(74) *Attorney, Agent, or Firm* — James W. Judge

(57) ABSTRACT

A bag sealing tape which can be repeatedly used without damaging a banded object such as a bag or the like when the object is opened, and which does not have to be separated for disposal; and a banding device and a banding method using the bag sealing tape. The bag sealing tape includes adhesion zones and non-adhesion zones, and the adhesion zones are disposed on the surface of a base film in a stepping stone manner in a length direction of the base film.

6 Claims, 7 Drawing Sheets

F I G . 7
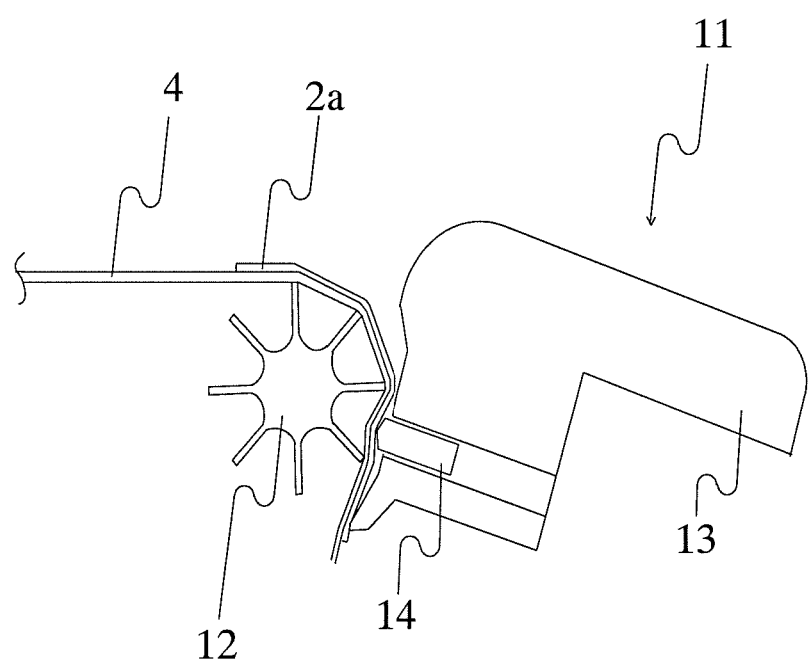

BAG SEALING TAPE, AND BANDING DEVICE AND BANDING METHOD USING THE BAG SEALING TAPE

BACKGROUND OF THE INVENTION

Field of the Invention

The present invention relates to a bag sealing tape, and a banding device and a banding method using the bag sealing tape. In more detail, the present invention relates to a bag sealing tape capable of being repeatedly used without damaging an object that is banded by the bag sealing tape; and the present invention also relates to a banding device and a banding method using the bag sealing tape.

Description of the Background Art

Conventionally, bread, confectioneries, vegetables, fruits, fresh noodles, frozen food, etc., are placed in a to-be-banded object such as a plastic bag and the like, and then an opening of the bag (neck of the bag) is banded with a single-sided pressure sensitive adhesive tape by using a banding device. In such a case, the pressure sensitive adhesive tape is placed on the neck of the to-be-banded object so as to form a ring, and adhesion zones at both ends of the pressure sensitive adhesive tape are stuck together so as to overlap with each other. Therefore, it is difficult to peel off this pressure sensitive adhesive tape when opening the bag, and it is often the case where the bag is torn, or the pressure sensitive adhesive tape or the banded object is cut with scissors to take out contents of the bag. Thus, opening a banded object takes time and effort, and contents remaining in the banded object have to be transferred to another container in to be preserved.

On the other hand, there have been known repeatedly usable resin-made banding materials that has a metal core body (e.g., wire). To band an object, such a resin-made banding material is wound around a neck of a to-be-banded object and both ends of the material are twisted together; and to take out contents, a twisted portion thereof is unraveled to open the banded object. However, it has been inconvenient when disposing of such banding materials, since it is necessary to separate the resin from the wire for proper disposal of different types of materials.

In order to solve such a problem, Patent Literature 1 (Japanese Laid-Open Patent Publication No. 2003-335307) discloses a banding device and a banding structure which can be easily torn when opening a banded object.

However, according to the banding structure disclosed in Patent Literature 1, although the possibility of damaging the bag is reduced, the banding structure cannot be repeatedly used and thereby a sufficient solution is not provided with regard to preservation of contents remaining in the bag.

U.S. Pat. No. 5,389,438 to Miller et al. discloses an adhesive tape in which an adhesive of elastomeric block copolymers and tackifying materials is hot-melt coated onto a flexible backing. The adhesive tape is designed so that two pieces of the tape bonded to each other are shear resistant yet easily peeled apart. In a principle embodiment, Miller et al. teach employing their adhesive tape as patches for closing a disposable diaper. Column 7, lines 7 through 10 of the reference state, "The overlapping portions of the adhesive patches should provide a force to peel generally from 2 to 12 N, preferably from 5 to 7 N." It will be appreciated that this numerical range is not a value from a tension test performed at a given tension speed, nor is it a value per unit length. On the other hand, a standard test for determining adhesive peel strength is the T-type test (tension test) in which peeling is performed at a tension speed of 300 mm/min, with the T-type peel strength being given as a value per 10 mm.

Under "Testing" in the same column of the patent, Miller et al. explains,

This is run according to PSTC-5 using a polyethylene substrate to which the test tape was applied using a 2-kg hard rubber roller, one pass in each direction at 30 cm/min. An adhesive which has a 90° Peel Value of from 2 to 8 N/25 mm should be useful for making note pads of repositionable sheets like POST-IT™ note pads, because such adhesive-bearing sheets should adhere well to paper and other substrates while being removable without picking fibers, even after prolonged periods of time. When the 90° Peel Value is from 0 to 2 N/25 mm, the adhesive would be most useful in the above-described adhesive-to-adhesive diaper closure as these are the least likely to adhere to ordinary packaging materials or to the non-adhesive surfaces of the diaper and hence will not require the use of a protective tape.

Hence, Miller et al. discloses a 90° Peel Value of from 2 to 8 N/25 mm (which equals from 0.8 to 3.2 N/10 mm) as a value useful for making note pads of repositionable sheets, such as POST-IT™ pads. The adhesive layers in such note pads are designed for adhering well to paper and other non-adhesive substrate surfaces, however, meaning that they are designed for a purpose different from that of adhesive layers for bag sealing tapes.

And returning to the disposable diaper, Miller et al. discloses a 90° Peel Value of from 0 to 2 N/25 mm as a value most useful for an adhesive-to-adhesive diaper closure. It will be appreciated that this numerical range converted to the per-10-mm length of the T-type peel test is 0 to 0.8 N/10 mm.

U.S. Pat. App. Pub. 2009/0202183 in the name of Hagino discloses film laminate structures for sealable plastic packaging containers. The reference is silent, however, as to technology for bonding an adhesive layer to an adhesive layer; the reference merely discloses technology for forming an adhesive layer having adhesive and non-adhesive portions so that adhesion and peeling-off of the outermost layer (non-adhesive surface) can be carried out repeatedly. That is, Hagino does not teach that the peel strength of an adhesive layer (an adhesive layer to be bonded to an adhesive layer) such as would be employed for a bag sealing tape can be controlled. Nor does Hagino teach the adoption of non-adhesion zones for a bag sealing tape.

SUMMARY OF THE INVENTION

Therefore, an objective of the present invention is to provide: a bag sealing tape which can be repeatedly used without damaging a banded object such a bag or the like when it is opened, and which does not have to be separated for disposal; and a banding device and a banding method using the bag sealing tape.

The bag sealing tape of the present invention is a bag sealing tape including adhesion zones and non-adhesion zones. Adhesion layers forming the adhesion zones are adhered to the surface of a base film in a stepping stone manner in a length direction of the base film. A user can easily hold the non-adhesion zones when opening a banding body, and thereby the bag sealing tape is convenient when being opened.

When two of the adhesion layers are adhered together, a peeling strength (A) required for separating the two is preferably smaller than an adhesion strength (B) between one of the adhesion layers and the base film. More preferably, the peeling strength (A) is from 0.1 to 10 N/10 mm. The adhesion zones adhered to the base film will not be peeled off when the user is opening a banding body. Therefore, in a case where a bag is banded again to preserve remaining contents, the bag sealing tape of the present invention can be repeatedly used with further certainty.

Preferably, a ratio of a length of one of the adhesion zones to a length of one of the non-adhesion zones in the length direction of the bag sealing tape is from 9:1 to 1:1.5. With this, yield rate will improve since the bag sealing tape does not have excess adhesion zones or non-adhesion zones.

When one of the non-adhesion zones having a cutting reference position is cut at the cutting reference position to obtain a first non-adhesion zone and a second non-adhesion zone, a length (h1) of the first non-adhesion zone and a length (h2) of the second non-adhesion zone are both preferably lengths that can be held effortlessly by the user. The difference (h1−h2) between lengths of both non-adhesion zones is provided to enable both of the overlapping holding parts to be easily recognized and easily picked up by the user in the case where the user tries to open a banded portion by expanding the holding parts rightward and leftward or upward and downward, i.e., in opposing directions. A gap may be provided between both of the holding parts that overlap with each other after being banded, by embossing the whole surface of one part of the non-adhesion zone. As a result, convenience when holding the holding parts improves.

Each of the adhesion zones is preferably a zone traversing the base film in a width direction thereof. By having each of the adhesion zones of the bag sealing tape traversing the base film in the width direction, banding by using the banding body can be conducted with more certainty.

Furthermore, a banding device of the present invention is a banding device using a bag sealing tape which includes non-adhesion zones, and adhesion zones that are disposed on a surface of a base film in a stepping stone manner in a longitudinal direction of the base film. The banding device includes a tape holder for holding the wound bag sealing tape, cutting means, and a cutting reference position adjusting mechanism. When one of the non-adhesion zones of the bag sealing tape is cut by the cutting means to obtain a first non-adhesion zone and a second non-adhesion zone, the cutting reference position adjusting mechanism adjusts a cutting reference position such that a difference (h1−h2) between a length (h1) of the first non-adhesion zone and a length (h2) of the second non-adhesion zone becomes a length that can be recognized by the user as a holding part after the cutting. The cutting means is means for cutting the bag sealing tape, which has a cutting reference position adjusted by the cutting reference position adjusting mechanism, at the cutting reference position after the adjusting. When banding a to-be-banded object by using the bag sealing tape, the banding device can set the difference (h1−h2) of the non-adhesion zones at a length that the user can hold on, and thereby opening of the banding body becomes easy.

The cutting reference position adjusting mechanism preferably includes a gear shaped winding roller, a retention section, and a piston mechanism disposed at the retention section. Preferably, the bag sealing tape is arranged so as to envelop a gear of the winding roller, and a tip portion of the gear of the winding roller abuts the retention section via the bag sealing tape enveloping the tip portion of the gear. Preferably, the piston mechanism is a mechanism for adjusting, in a state where the tip portion of the gear abuts the retention section, a cutting reference position by urging the bag sealing tape, which is enveloping the tip portion of the gear, in a direction of a trough portion of the gear. With this, the banding device can adjust the cutting reference position of the bag sealing tape with more certainty, and a secure banding can be better reproduced.

Preferably, the banding device further includes a holding mechanism at a position preceding the winding roller. Preferably, the holding mechanism holds the non-adhesion portions of the bag sealing tape, and functions as a stopper for controlling an amount of movement of the bag sealing tape. With this, for example, even when the present banding device is automated and the banding bodies are mass-produced, the banding device can adjust the cutting reference position of the bag sealing tape with more certainty.

Furthermore, a banding method of the present invention is a banding method using the bag sealing tape which includes non-adhesion zones, and adhesion zones that are disposed on a surface of a base film in a stepping stone manner in a length direction of the base film. The banding method includes: (1) a drawing step of drawing out, from a tape holder holding the bag sealing tape which is wound, the bag sealing tape by a cutting reference position adjusting mechanism; (2) a banding step of guiding the drawn bag sealing tape to a gear shaped winding roller which includes a trough portion for guiding a to-be-banded object, and guiding and banding the to-be-banded object while pressing thereof against the trough portion via the guided bag sealing tape; and (3) a cutting step of cutting one of the non-adhesion zones by cutting means disposed at a position following the winding roller to obtain a first non-adhesion zone and a second non-adhesion zone, such that a difference (h1−h2) between a length (h1) of the first non-adhesion zone and a length (h2) of the second non-adhesion zone becomes a length recognizable as a holding part by a user. When banding a to-be-banded object by using the bag sealing tape, the banding method can set the difference (h1−h2) of the non-adhesion zones at a length that allows the holding part to be recognizable by the user, and thereby opening of the banding body becomes easy.

Preferably, the cutting reference position adjusting mechanism includes a gear shaped winding roller, a retention section, and a piston mechanism disposed at the retention section. Preferably, the bag sealing tape is arranged so as to envelop a gear of the winding roller, and a tip portion of the gear of the winding roller abuts the retention section via the bag sealing tape enveloping the tip portion of the gear. Preferably, the piston mechanism is a mechanism which adjusts, in a state where the tip portion of the gear abuts the retention section, a cutting reference position by urging the bag sealing tape, which is enveloping the tip portion of the gear, forward and backward in a direction of a trough portion of the gear. With this, the banding method can adjust the cutting reference position of the bag sealing tape with more certainty, and a secure banding can be reproduced better. For example, even when a factory line is automated by using the present banding method and the banding bodies are mass-produced, the cutting reference position of the bag sealing tape can be adjusted with more certainty.

The present invention can provide: a bag sealing tape which can be repeatedly used without damaging a to-be-banded object such as a bag or the like when the banded object is opened, and which does not have to be separated for disposal; and a banding device and a banding method using the bag sealing tape.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a schematic diagram for describing a cutting reference position adjusting mechanism of the banding device according to one embodiment (Embodiment 3) of the present invention.

DESCRIPTION OF THE PREFERRED EMBODIMENTS

Embodiment 1

Figure 1:
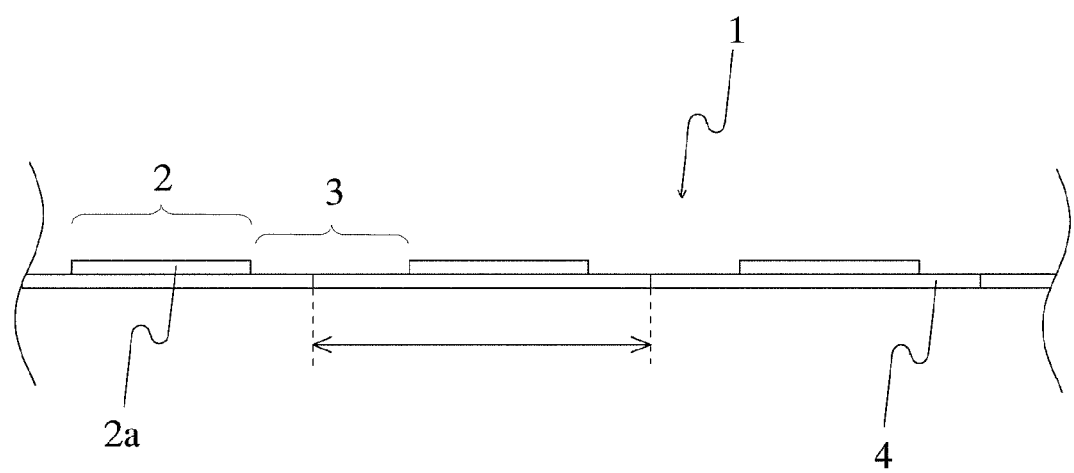
FIG. 1 is a side view of a bag sealing tape according to one embodiment (Embodiment 1) of the present invention.
Figure 2:
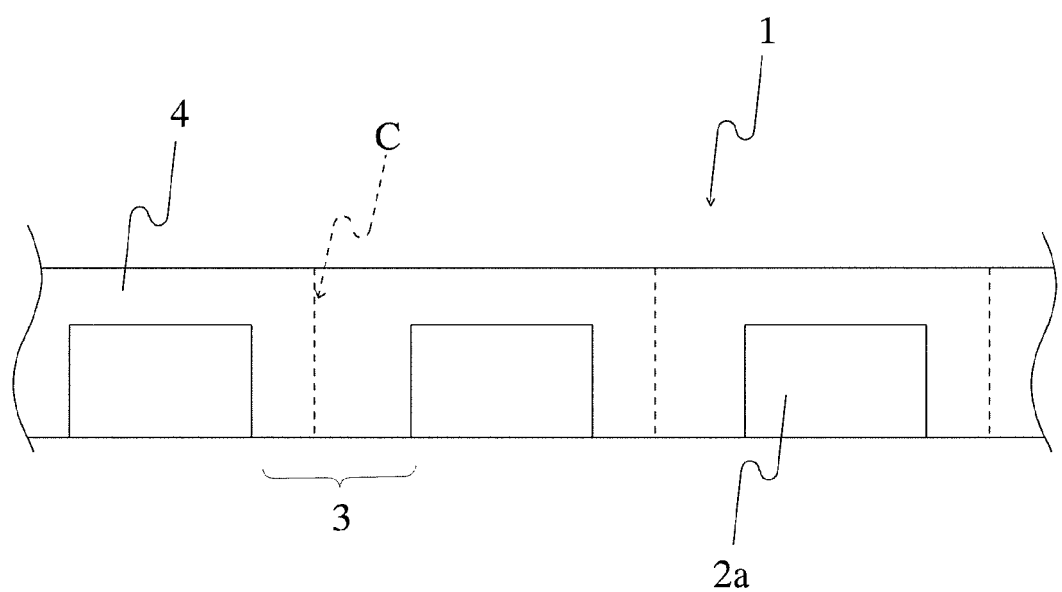
FIG. 2 is a plain view of the bag sealing tape according to one embodiment (Embodiment 1) of the present invention.

A bag sealing tape 1 according to Embodiment 1 of the present invention is shown in FIG. 1 and FIG. 2. The bag sealing tape 1 of the present embodiment is a bag sealing tape including non-adhesion zones 3 and adhesion zones 2. Adhesion layers 2a forming the adhesion zones 2 are adhered to the surface of a base film 4 in a stepping stone manner in the length direction of the base film 4. Thus, by having a pressure sensitive adhesive applied on the surface of the base film 4, the adhesion zones 2 formed by the adhesion layers 2a are obtained, and the zones not having the pressure sensitive adhesive applied thereon form the non-adhesion zones 3.

The base film 4 is a long film, and there is no particular limitation in its material, and examples thereof include a film, a paper, a nonwoven fabric, a cloth, or a lamination of one or more of those, which consists of polyolefin resins such as polyethylene and polypropylene, polyester resins such as polyethylene terephthalate (PET), aromatic vinyl resins such as vinyl chloride resins, acrylic resins, and polystyrene, synthetic resins such as polyamide resins, polyimide resins, polycarbonate resins, and cellulose triacetate, or biodegradable resins such as polylactic acid. From a standpoint of easily banding an object 5 and having a proper hardness, PET and biaxial oriented polypropylene (OPP) are preferable. It should be noted that materials obtained by coloring or printing letters and pictures on these base materials may be selected and used as appropriate. PET is used in the present embodiment. The thickness of the base film 4 is preferably from 16 μm to 100 μm, more preferably from 20 μm to 75 μm and particularly preferably from 25 μm to 50 μm. If the thickness is smaller than 16 μm, an obtained tape tends to have problems such as splitting, stretching, or being difficult to be wound on the object 5 due to not having elasticity. If the thickness is larger than 100 μm, it tends to be difficult to wind the tape on the object 5 due to being too hard.

The pressure sensitive adhesive includes, acrylic pressure sensitive adhesives, semisolid acrylic copolymers, rubber pressure sensitive adhesives, hot melt pressure sensitive adhesives, emulsion pressure sensitive adhesives, UV curable pressure sensitive adhesives, and the like. Rubber pressure sensitive adhesives are preferable from the standpoint of having superior initial adhesive force. In the present embodiment, a rubber pressure sensitive adhesive is used.

Those that are preferable when blended in the pressure sensitive adhesive include natural rubber as a base polymer if necessary, other polymers, tackifying resins, antiaging agents, inorganic fillers, softening agents, and the like.

Such other polymers include butyl rubbers, butadiene rubbers, isobutylene rubbers, chloroprene rubbers, styrene-butadiene rubbers, styrene-butadiene-styrene copolymerization rubbers, styrene-isoprene-styrene copolymerization rubbers and the like. The blend amount of the other polymer is from 30 to 90 wt % with respect to 100 parts by weight of the pressure sensitive adhesive. Used in the present embodiment are 15 wt % of natural rubber, 30 wt % of AMERIPOL 1013N as a styrene-butadiene rubber, and 15 wt % of Quintac 3433N as a styrene-isoprene-styrene copolymerization rubber.

The tackifying resins include hydrogenated petroleum resins, aliphatic petroleum resins, aromatic petroleum resins, aliphatic/aromatic copolymerized petroleum resins, alicyclic petroleum resins, rosin based resins, terpene resins, terpene phenolic resins, coumarone-indene resins, and the like. The blend amount of a tackifying resin is from 10 to 70 wt % with respect to 100 parts by weight of the pressure sensitive adhesive. Used in the present embodiment are 13 wt % of YS resin PX1000 as a terpene phenolic resin, and 5 wt % of Arkon P-100 and 10 wt % of Arkon P-90 as hydrogenated petroleum resins.

The blend amount of an antiaging agent is from 0.1 to 10 parts by weight with respect to 100 parts by weight of the pressure sensitive adhesive. In the present embodiment, 1 wt % of Yoshinox 425, 10 parts by weight of zinc white No. 3 as zinc which is an inorganic filler, and 1 part by weight of KRONOS KA-10 as titanium oxide which is a pigment are used.

The thickness of the adhesion layers 2a is preferably from 10 μm to 25 μm, more preferably from 15 μm to 20 μm, and particularly preferably from 17 μm to 20 μm. If the thickness is smaller than 10 μm, an obtained adhesive power is not sufficient and faulty bandings tend to occur. If the thickness is larger than 25 μm, the adhesive power is too strong and it becomes difficult to open the bag or the banded object 5 will be damaged upon opening; therefore, the objective of the present invention, which is not to damage the banded object 5 but to enable easy opening and re-banding, may not be achieved.

There is no particular limitation in the method for applying the pressure sensitive adhesive on the base film 4, and various widely used methods can be used, including application methods using instruments such as brushes, spatulas, rollers, and caulking guns, and coating methods using dedicated equipment for mass production such as air sprays, nozzle sprays, roll coaters, beads, and the like. In the present embodiment coating is performed by using a die coater. Preferably, the base film is coated with a primer in accordance with needs, before having the pressure sensitive adhesive coated thereon.

As shown in FIG. 2, in the present embodiment, the adhesion zones 2 are disposed on the surface of the base film 4 in a stepping stone manner in the longitudinal direction of the base film 4. As a result, for example, when a cutting reference position C of one of the non-adhesion zones 3 is cut and the object 5 is banded, the object 5 can be sufficiently banded by the adhesion zones 2, and the non-adhesion zones 3 will appear at the ends of the bag sealing tape 1 after the cutting. Therefore, the user can easily hold the ends of the non-adhesion zones 3, and the bag or the bag sealing tape 1 itself will not be damaged when opening the bag.

When the strength required for peeling two adhere adhesion zones 2 is defined as a peeling strength (A), and when the adhesion strength between the adhesion zones 2 and the base film 4 is defined as an adhesion strength (B), the peeling strength (A) is preferably smaller than the adhesion strength (B). The peeling strength (A) is further preferably from 0.1 to 10 N/10 mm, particularly preferably from 1 to 8 N/10 mm, and extremely preferably from 3 to 5 N/10 mm. For example, there are cases where, when banding the object 5, the length of one of the adhesion zones 2 is greater than the thickness (mid-portion circumference) of the banded object 5 and thereby the one adhesion zone 2 adheres itself. However, even in such cases, by having the peeling strength (A) smaller than the adhesion strength (B), when releasing the band, the adhesion zone 2 will not be peeled off the base film 4 due to one of the adhesion zones 2 strongly adhering to itself. As a result, re-banding is possible, and repeated use can be achieved for the tape.

The length of the adhesion zones 2 needs to be adjusted depending on the thickness (mid-portion circumference) of the banded object 5. The length of the adhesion zones 2 is not particularly limited, and is generally a length of about 40 to 90 mm; and for this length, at minimum, about 5 to 10 mm of the non-adhesion zones 3 is necessary. The length of the non-adhesion zones 3 is also not particularly limited, and any length can be used as long as the length of the non-adhesion zones 3 is one that can be held by the user, and as long as the length of the non-adhesion zones 3 is in a range that does not cause a faulty banding due to having the length of the non-adhesion zones 3 being too lengthy thus inevitably having the length of the adhesion zones 2 too short. When represented in ratio, the ratio of the length of the adhesion zones 2 to the length of the non-adhesion zones 3 is preferable from 9:1 to 1:1.5, further preferably from 7:1 to 1:1.2, and particularly preferably from 4:1 to 1:1. The sum (hereinafter, referred to as 1 pitch) of the length of one of the adhesion zones 2 and the length of one of the non-adhesion zones 3 is preferably about 45 mm to 100 mm, further preferably from 60 mm to 90 mm, and particularly preferably from 70 to 85 mm. Due to the relationship the ratio of lengths described above, if a 1-pitch length is shorter than 45 mm, the non-adhesion zones 3 becomes extremely short, and thereby it tends to be difficult for the user to hold on. Furthermore, if the 1-pitch length is longer than 100 mm, excessive adhesion zones 2 and non-adhesion zones 3 are produced and convenience tends to deteriorate.

When one of the non-adhesion zones 3 is cut at the cutting reference position C to obtained a first non-adhesion zones 3a and a second non-adhesion zone 3b, a difference (h1–h2) between a length (h1) of the first non-adhesion zone 3a and a length (h2) of the second non-adhesion zone 3b is preferably a length recognizable by the user as a holding part. Here, although "a length recognizable by the user as a holding part" cannot be strictly defined since it is influenced by each user's skill level, it is conceivable that many users will recognize a length as a holding part if it is, for example, 0.5 mm or longer.

With the bag sealing tape 1 according to the present embodiment, a bag sealing tape, which can be repeatedly used without damaging the banded object 5 such as a bag or the like when opening the object 5, and which does not have to be separated for disposal, can be provided.

Embodiment 2

Figure 3:
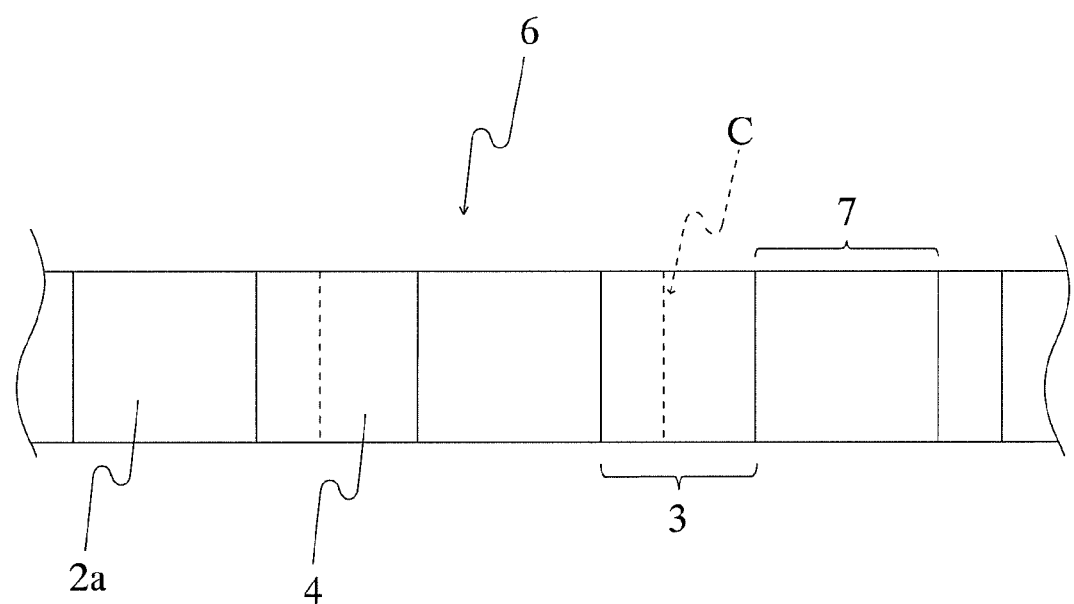
FIG. 3 is a side view of a bag sealing tape according to one embodiment (Embodiment 2) of the present invention.

A bag sealing tape 6 according to the present embodiment is shown in FIG. 3. The bag sealing tape 6 of the present embodiment does not differ from the bag sealing tape 1 of Embodiment 1, except that adhesion zones 7 are zones that traverse the base film 4 in the width direction.

In the present embodiment, the adhesion zones 7 traverse the base film 4 in the width direction. As a result, convenience when re-pasting a tape is improved, since adhesion area is larger and the user can easily re-paste a bag sealing tape without using a special banding device after opening the bag sealing tape which has been banding the banded object 5.

Except for the difference described above, the materials, lengths, and physical properties of the base film 4, the non-adhesion zones 3, and the like are similar to those in Embodiment 1; and descriptions of those are omitted and reference characters identical to those in Embodiment 1 are given in FIG. 3. Furthermore, the material, length, physical properties, and the like of the adhesion zones 7 are similar to the adhesion zones 2 of Embodiment 1.

With the bag sealing tape 6 of the present embodiment, in addition to the advantageous effects obtained by the bag sealing tape 1 of Embodiment 1, an advantageous effect of an ability to band the object 5 with more certainty can be obtained, since the adhesion zones 7 traverse the base film 4 in the width direction.

Embodiment 3

Figure 4:
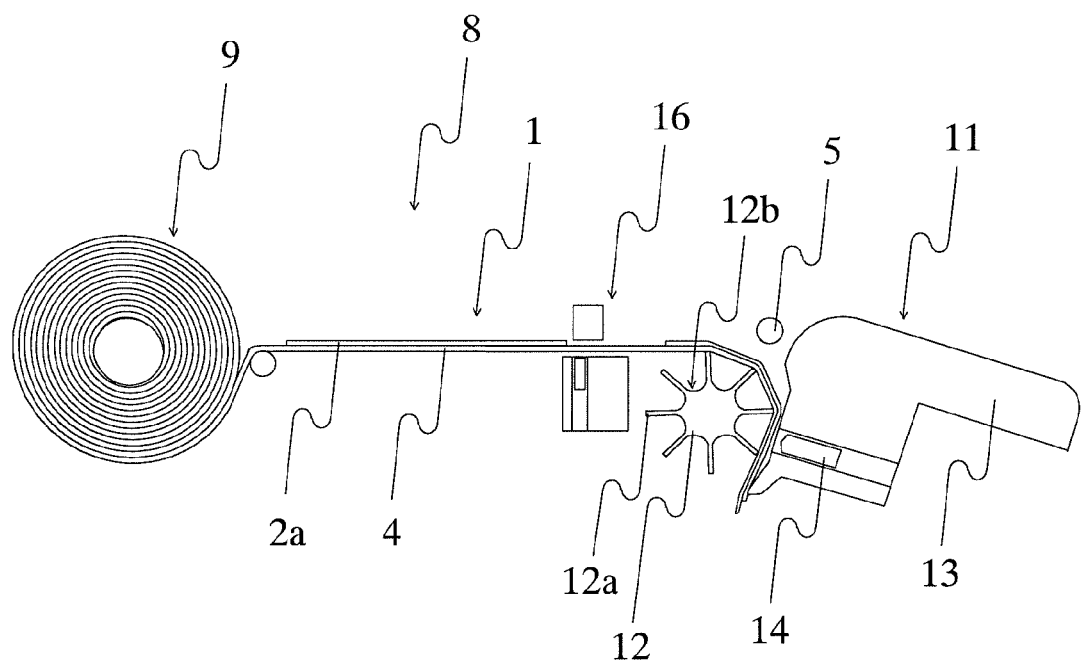
FIG. 4 is a schematic diagram for describing a banding device according to one embodiment (Embodiment 3) of the present invention.

Described in the present embodiment are a banding device 8 using the bag sealing tape 1 of Embodiment 1, and a banding method using the bag sealing tape 1 of Embodiment 1. FIG. 4 shows a schematic diagram of the banding device 8 of present embodiment. In FIG. 4, parts (a housing of the banding device 8, etc.) that are not particularly important for describing the banding device 8 of the present embodiment are omitted as appropriate.

The banding device 8 of the present embodiment is a banding device using the bag sealing tape 1. The bag sealing tape 1 includes the non-adhesion zones 3 and the adhesion zones 2. The adhesion zones 2 are disposed on the surface of the base film 4 in a stepping stone manner in the longitudinal direction of the base film 4. The materials, lengths, and physical properties of the bag sealing tape 1, the base film 4, the adhesion zones 2, the non-adhesion zones 3, and the like are similar to those in Embodiment 1; and descriptions of those are omitted and reference characters identical to those in Embodiment 1 are given in FIG. 4.

The banding device 8 of the present embodiment includes a tape holder 9 for holding the bag sealing tape 1 which is wound, cutting means 10, and a cutting reference position adjusting mechanism 11. The cutting means is means for cutting, at the cutting reference position C, the bag sealing tape 1 whose cutting reference position C is adjusted by the cutting reference position adjusting mechanism 11. When the bag sealing tape 1 is cut by the cutting means 10 and one of the non-adhesion zones 3 is cut to obtain the first non-adhesion zone 3a and the second non-adhesion zone 3b, the cutting reference position adjusting mechanism 11 is a mechanism that adjusts a cutting reference position such that the difference (h1−h2) between the length (h1) of the first non-adhesion zone 3a and the length (h2) of the second non-adhesion zone 3b becomes a length that can be recognized by the user as a holding part G after the cutting.

When the bag sealing tape 1 is loaded on the banding device 8, as shown in FIG. 4, the bag sealing tape 1 is wound on the tape holder 9 and is retained in a housing (not shown) of the banding device 8. A bag sealing tape 1 drawn out of the tape holder 9 is fed, via a guide roller, to the cutting reference position adjusting mechanism 11 located at a position following the tape holder 9, and is cut by the cutting means 10 after the object 5 has been banded.

When the bag sealing tape 1 is cut by the cutting means 10 and one of the non-adhesion zones 3 is cut to obtain the first non-adhesion zone 3a and the second non-adhesion zone 3b, the cutting reference position adjusting mechanism 11 is a mechanism that adjusts the cutting reference position C such that the difference (h1−h2) between the length (h1) of the first non-adhesion zone 3a and the length (h2) of the second non-adhesion zone 3b becomes a length that can be recognized by the user as the holding part G after the cutting.

The cutting reference position adjusting mechanism 11 includes a gear shaped winding roller 12, a retention section 13, and a piston mechanism 14 disposed at the retention section 13. As shown in FIG. 4, the bag sealing tape 1 is arranged so as to envelop a ridge portion 12a of a gear of the winding roller 12, and the ridge portion 12a of the gear of the winding roller 12 abuts the retention section 13 via the bag sealing tape 1 enveloping the ridge portion 12a. The piston mechanism 14 is a mechanism for adjusting, in a state where the ridge portion 12a of the gear abuts the retention section 13, the cutting reference position C by urging the bag sealing tape 1, which envelops the ridge portion 12a, forward and backward in a direction of a trough portion 12b of the gear.

As shown in FIG. 4, the to-be-banded object 5 is guided to the trough portion 12b of the winding roller 12 enveloped by the bag sealing tape 1. The adhesion zones 2 of the bag sealing tape 1 adhere to the surface of the object 5 which has been guided. In this state where the object 5 is being pressed, the winding roller 12 is rotated in a clockwise direction in FIG. 4. As a result, the circumference of the object 5 is wrapped by the bag sealing tape 1. Since the cutting means 10 has not been operated at this point in time, a predetermined length of the bag sealing tape 1 is drawn out from the tape holder 9 in accordance with the advance of the object 5.

Figure 5:
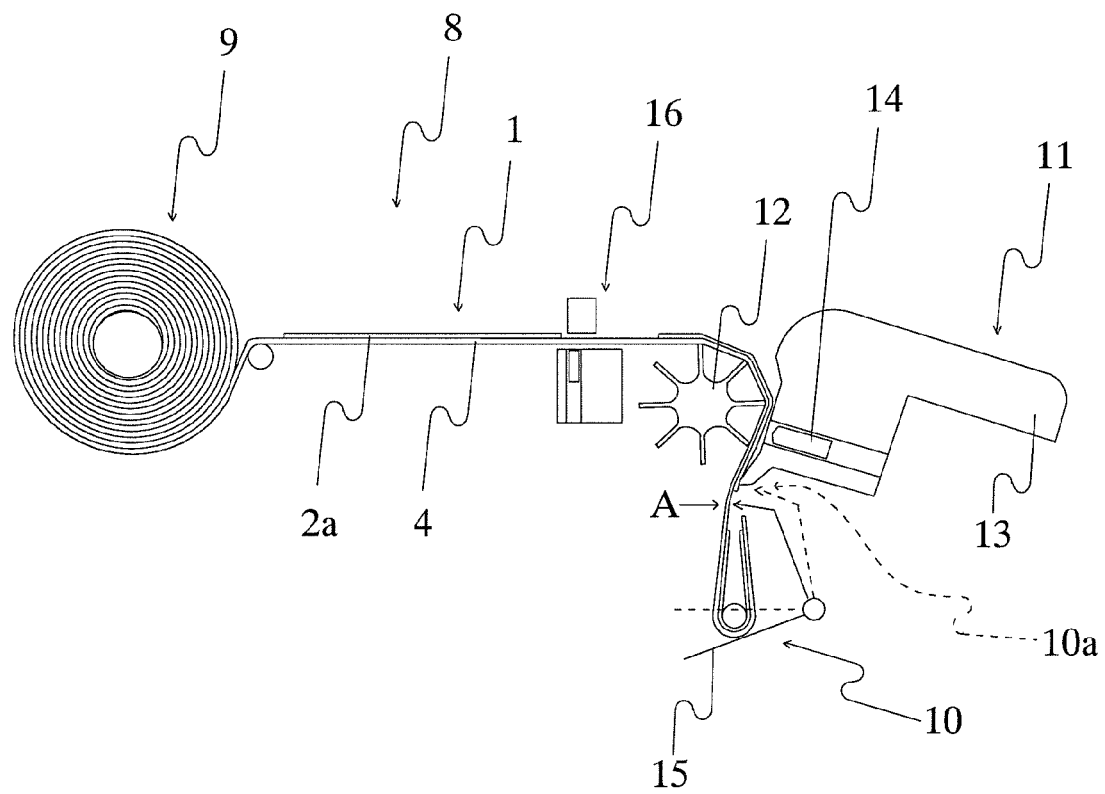
FIG. 5 is a schematic diagram for describing the banding device according to one embodiment (Embodiment 3) of the present invention.
Figure 6:
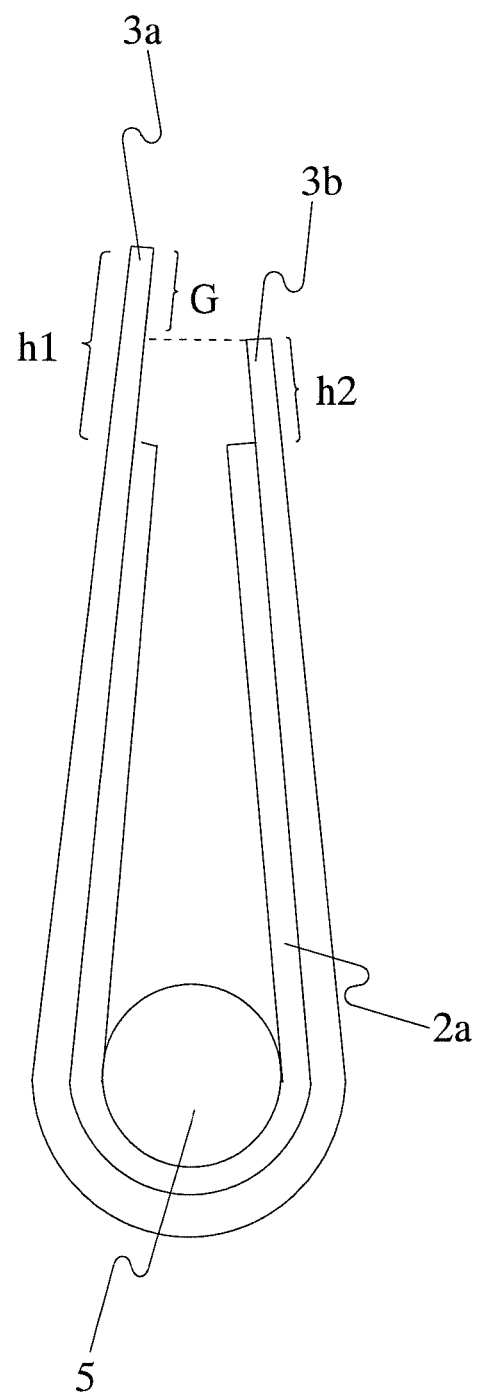
FIG. 6 is a schematic diagram for describing a banding body for banding an object by using the banding device according to one embodiment (Embodiment 3) of the present invention.

Next, when the object 5 travels to where it is shown in FIG. 5, a cutting lever 15 of the cutting means 10 is pressed, and one of the non-adhesion zones 3 of the bag sealing tape 1 is cut by a cutting section 10a disposed at the tip of the cutting means 10. At this point, the cutting reference position C is at a position shown by an arrow A, and the length (h1) of the first non-adhesion zone 3a obtained by a cut at such position is longer than the length (h2) of the second non-adhesion zone 3b as shown in FIG. 6. Therefore, the holding part which is to be recognized by the user when opening the banding body, is provided.

After the cutting, the cutting lever 15 is returned to a position before the cutting by an urging member (not shown) such as a spring and the like. In the present embodiment, such urging member, and the piston mechanism and a later described holding mechanism 16 are connected to a cylinder mechanism (not shown) filled with air. When the cutting lever 15 is returned to the position before the cutting, the piston mechanism 14 in cooperation with the cylinder mechanism presses the bag sealing tape 1 enveloping the ridge portion 12a of the winding roller 12, toward a direction of the trough portion 12b of the gear, as shown in FIG. 7. Next, fine adjustment of a new position of the bag sealing tape 1 which has been already drawn out for the predetermined length is conducted in the length direction, and preparation for banding a new object 5 is completed.

In the present embodiment, as shown in FIG. 4 and FIG. 5, the holding mechanism 16 is disposed at a position preceding the winding roller 12. The holding mechanism 16 is a mechanism that operates in cooperation with the above described cylinder mechanism when the cutting lever 15 is pressed by the object 5, and functions as a stopper for controlling the amount of movement of the bag sealing tape 1 by holding the non-adhesion zones 3 of the bag sealing tape 1. As described above, when the bag sealing tape 1 is wound on the object 5, the bag sealing tape 1 rotates the winding roller 12 to newly draw out a predetermined length of the bag sealing tape 1 from the tape holder 9. Furthermore, as described above, fine adjustment of the position of the new bag sealing tape 1 is conducted through cooperation of the piston mechanism 14 and the cylinder mechanism when the cutting has been performed. The holding mechanism 16 holds the non-adhesion zones 3 of the bag sealing tape 1 such that the bag sealing tape 1 will not be excessively drawn out by mistake when fine adjustment of the initial position of the bag sealing tape 1 is conducted, and the holding mechanism 16 functions as a stopper for controlling the amount of movement of the bag sealing tape 1. Such mechanism is enabled by adjustment through the cylinder mechanism conducted slightly prior to the operation of the piston mechanism 14. With this, accurate adjustment of the initial position of the bag sealing tape 1 is possible.

With the present embodiment, the banding device 8 and the banding method can be provided for the bag sealing tape 1, which can be repeatedly used without damaging the banded object 5 such as a bag or the like when opening the object 5, and which does not have to be separated for disposal.

In Embodiments 1 to 3, although an intermittent coating method for forming an adhesion layer on the base film is employed as a method to form the adhesion zone, the present invention is not limited to such method. A method may be employed in which an adhesion layer is provided on the whole surface of the base film and then adhesive power of one part of the adhesion layer is weakened. The method for weakening the adhesive power includes, for example, a method of locally spraying a powder, a method of applying a mold releasing agent, and a method of pasting another member (film, paper, etc.); however, the present invention is not particularly limited thereto. Furthermore, in Embodiment 3, a configuration including a piston mechanism, a cylinder mechanism, and cutting means has been described; however the present invention is not limited to such configuration, and, for example, the piston mechanism may be omitted, the cylinder mechanism may be omitted, and a spring may be employed instead of the piston mechanism. Furthermore, a sensor function may be provided instead of these mechanisms; and various mechanisms can be adopted without any limitation as long as fine adjustment of the cutting reference position is possible.

A bag sealing tape of the present invention will be described in detail by means of examples in the following. Evaluation methods are described below.

1. Self-Adhesion Retention Force

A bag sealing tape having a width of 20 mm and a length of 150 mm was cut, and a part of the tape's adhesion layer was pasted to another part thereof with one round-trip of compression bonding by using a 2 kg rubber roller. With one round-trip of compression bonding using a 2 kg rubber roller, one end of the tape was pasted onto a SUS304 steel grinded by a #280 waterproof abrasive paper. After the tape has been kept still for 20 minutes, a 170 g load was placed on the other end at 40° C., and the time required for the load to drop was measured.

2. Retention Strength (Shifting Distance)

A polypropylene bag (a bag constituting an object to be banded in the examples) was banded by using a banding device (Pylon Bag Sealer Ace manufactured by KYOWA Ltd.,); and a mark was placed on the tape at a position closest to the bag where the adhesion layers were pasted together. After keeping it still for 4 days, a shifting distance, which is generated due to peeling, between the mark and where the adhesion layers were pasted together after being kept was measured.

3. Self-Adhesion Force

A bag sealing tape having a width of 20 mm was cut, and the tape's adhesion layer was pasted to itself with one round-trip of compression bonding by using a 2 kg rubber roller. 20 minutes after the pasting, the pasted bag sealing tape was fixed on a tension test machine (Autograph type AGS-J manufactured by Shimadzu Corporation), and a T-type peeling was performed at a tension speed of 300 mm/min. The peeling force was measured and was used as a self-adhesion force.

4. Practical-use Test

Bag sealing tapes prepared in Examples 1 to 6, Comparative Example 1, and Comparative Example 2 were banded by using a banding device according to Embodiment 3, and respective banded states of those were evaluated. Evaluations of the banded states were conducted by a focus group consisting of 4 people (2 males and 2 females; average age of 43), and the ease of opening a bag sealing tape in a banded state was evaluated. The following standards were used for evaluation.

Band Integrity
- ◎: Banding can be performed without any problem.
- ○: No problem in the banding itself, but the shifting distance was a concern.
- Δ: Although banding was maintained, the shifting distance was large and sealing performance was deficient.
- ×: Insufficient banding, or the bag was not banded.

Openability
- ◎: The holding part can be easily held, and the bag can be opened.
- ○: The holding part can be recognized, and the bag can be opened.
- ×1: The holding part cannot be held, and even if it could be held, the bag cannot be opened.
- ×2: The bag cannot be opened, or the bag was torn when being opened.
- —: Evaluation was not conducted since the bag was not banded.

Re-pasting Ability
- ◎: Re-pasting can be easily performed without any problem.
- ○: Although there was a slight decrease in adhesive power, re-pasting can be conducted.
- Δ: Although there was a decrease in adhesive power, re-pasting can be conducted.
- —: Evaluation was not conducted since the bag was not banded, the bag cannot be opened, or the bag was torn.

* (With regard to tearing in the bag, those that were not torn were represented as "○," and those that were torn were represented as "×.")

Overall Evaluation
- ◎: Satisfactory in band integrity, openability, and re-pasting ability.
- ○: Almost satisfactory in band integrity, openability, and re-pasting ability.
- Δ: Basically satisfactory, although the level of satisfaction varied from person to person.
- ×: Unsuitable for practical use.

The used materials are shown in the following.

Base Film:
 A 38 μm PET film (absent of any printings) (manufactured by Futamura Chemical Co., Ltd.)

Pressure Sensitive Adhesive:
 Natural rubber
 Quintac 3433N (rubber manufactured by Zeon Corporation)
 AMERIPOL 1013N (tackifier manufactured by ISP Co., Ltd.)
 Arkon P-90 (hydrogenated petroleum resin manufactured by Arakawa Chemical Industries, Ltd.)
 Arkon P-100 (hydrogenated petroleum resin manufactured by Arakawa Chemical Industries, Ltd.)
 YS RESIN PX1000 (tackifier manufactured by Yasuhara Chemical Co., Ltd.)
 Yoshinox 425 (antiaging agent; API Corporation)
 Zinc white No. 3 (zinc, inorganic filler; Seido Chemical Industry Co., Ltd.)
 KRONOS KA-10 (titanium oxide, pigment; Titan Kogyo Ltd.)

EXAMPLE 1

Materials shown in Table 1 were mixed, and toluene was added thereto. The mixture was agitated and melted for 240 minutes at 30° C. to obtain a pressure sensitive adhesive. A base film (a PET film having a thickness of 38 μm) was coated with the obtained pressure sensitive adhesive by using a die coater such that an adhesive thickness thereon became 20 μm, was dried with heat at 80° C., and was sliced into 9 mm wide strips to obtain a bag sealing tape. In the obtained bag sealing tape, the length of an adhesion zone was 60 mm, and the length of a non-adhesion zone was 20 mm. Evaluations of self-adhesion retention force, retention strength, and self-adhesion force were conducted by using the obtained bag sealing tape. The results are shown in Table 2. In addition, with the obtained bag sealing tape, a to-be-banded object (designed for bread manufacturers; a PP bag for six slices of bread; thickness around a neck of the bag was 32 mm) was banded by using the banding device according to Embodiment 3, and the banding was completed by cutting the bag sealing tape such that the length of the first non-adhesion zone was 11 mm and the length of the second non-adhesion zone was 9 mm. A practical-use test was performed on an obtained banding body. The results are shown in Table 2.

EXAMPLE 2

Materials shown in Table 1 were mixed, and toluene was added thereto. The mixture was agitated and melted for 240 minutes at 30° C. to obtain a pressure sensitive adhesive. A base film (a PET film having a thickness of 38 μm) was coated with the obtained pressure sensitive adhesive by using a die coater such that an adhesive thickness thereon became 20 μm, was dried with heat at 80° C., and was sliced into 9 mm wide strips to obtain a bag sealing tape. In the obtained bag sealing tape, the length of an adhesion zone was 60 mm, and the length of a non-adhesion zone was 20 mm. Evaluations of self-adhesion retention force, retention strength, and self-adhesion force were conducted by using the obtained bag sealing tape. The results are shown in Table 2. In addition, with the obtained bag sealing tape, a to-be-banded object (designed for bread manufacturers; a PP bag for six slices of bread; thickness around a neck of the bag was 32 mm) was banded by using the banding device according to Embodiment 3, and the banding was completed by cutting the bag sealing tape such that the length of the first non-adhesion zone was 11 mm and the length of the second non-adhesion zone was 9 mm. A practical-use test was performed on an obtained banding body. The results are shown in Table 2.

EXAMPLE 3

Materials shown in Table 1 were mixed, and toluene was added thereto. The mixture was agitated and melted for 240 minutes at 30° C. to obtain a pressure sensitive adhesive. A base film (a PET film having a thickness of 38 µm) was coated with the obtained pressure sensitive adhesive by using a die coater such that an adhesive thickness thereon became 20 µm, was dried with heat at 80° C., and was sliced into 9 mm wide strips to obtain a bag sealing tape. In the obtained bag sealing tape, the length of an adhesion zone was 69 mm and the length of a non-adhesion zone was 11 mm. Evaluations of self-adhesion retention force, retention strength, and self-adhesion force were conducted by using the obtained bag sealing tape. The results are shown in Table 2. In addition, with the obtained bag sealing tape, a to-be-banded object (designed for bread manufacturers; a PP bag for six slices of bread; thickness around a neck of the bag was 32 mm) was banded by using the banding device according to Embodiment 3, and the banding was completed by cutting the bag sealing tape such that the length of the first non-adhesion zone was 6 mm and the length of the second non-adhesion zone was 5 mm. A practical-use test was performed on an obtained banding body. The results are shown in Table 2.

EXAMPLE 4

Materials shown in Table 1 were mixed, and toluene was added thereto. The mixture was agitated and melted for 240 minutes at 30° C. to obtain a pressure sensitive adhesive. A base film (a PET film having a thickness of 38 µm) was coated with the obtained pressure sensitive adhesive by using a die coater such that an adhesive thickness thereon became 20 µm, was dried with heat at 80° C., and was sliced into 9 mm wide strips to obtain a bag sealing tape. In the obtained bag sealing tape, the length of an adhesion zone was 60 mm, and the length of a non-adhesion zone was 20 mm. Evaluations of self-adhesion retention force, retention strength, and self-adhesion force were conducted by using the obtained bag sealing tape. The results are shown in Table 2. In addition, with the obtained bag sealing tape, a to-be-banded object (designed for bread manufacturers; a PP bag for six slices of bread; thickness around a neck of the bag was 32 mm) was banded by using the banding device according to Embodiment 3, and the banding was completed by cutting the bag sealing tape such that the length of the first non-adhesion zone was 11 mm and the length of the second non-adhesion zone was 9 mm. A practical-use test was performed on an obtained banding body. The results are shown in Table 2.

EXAMPLE 5

Materials shown in Table 1 were mixed, and toluene was added thereto. The mixture was agitated and melted for 240 minutes at 30° C. to obtain a pressure sensitive adhesive. A base film (a PET film having a thickness of 38 µm) was coated with the obtained pressure sensitive adhesive by using a die coater such that an adhesive thickness thereon became 20 µm, was dried with heat at 80° C., and was sliced into 9 mm wide strips to obtain a bag sealing tape. In the obtained bag sealing tape, the length of an adhesion zone was 28 mm and the length of a non-adhesion zone was 20 mm. Evaluations of self-adhesion retention force, retention strength, and self-adhesion force were conducted by using the obtained bag sealing tape. The results are shown in Table 2. In addition, with the obtained bag sealing tape, a to-be-banded object (designed for bread manufacturers; a PP bag for six slices of bread; thickness around a neck of the bag was 32 mm) was banded by using the banding device according to Embodiment 3, and the banding was completed by cutting the bag sealing tape such that the length of the first non-adhesion zone was 11 mm and the length of the second non-adhesion zone was 9 mm. A practical-use test was performed on an obtained banding body. The results are shown in Table 2.

EXAMPLE 6

Materials shown in Table 1 were mixed, and toluene was added thereto. The mixture was agitated and melted for 240 minutes at 30° C. to obtain a pressure sensitive adhesive. A base film (a PET film having a thickness of 38 µm) was coated with the obtained pressure sensitive adhesive by using a die coater such that an adhesive thickness thereon became 20 µm, was dried with heat at 80° C., and was sliced into 9 mm wide strips to obtain a bag sealing tape. In the obtained bag sealing tape, the length of an adhesion zone was 76 mm and the length of a non-adhesion zone was 5 mm. Evaluations of self-adhesion retention force, retention strength, and self-adhesion force were conducted by using the obtained bag sealing tape. The results are shown in Table 2. In addition, with the obtained bag sealing tape, a to-be-banded object (designed for bread manufacturers; a PP bag for six slices of bread; thickness around a neck of the bag was 32 mm) was banded by using the banding device according to Embodiment 3, and the banding was completed by cutting the bag sealing tape such that the length of the first non-adhesion zone was 3 mm and the length of the second non-adhesion zone was 2 mm. A practical-use test was performed on an obtained banding body. The results are shown in Table 2.

COMPARATIVE EXAMPLE 1

Materials shown in Table 1 were mixed, and toluene was added thereto. The mixture was agitated and melted for 240 minutes at 30° C. to obtain a pressure sensitive adhesive. A base film (a PET film having a thickness of 38 µm) was coated with the obtained pressure sensitive adhesive by using a die coater such that an adhesive thickness thereon became 20 µm, was dried with heat at 80° C., and was sliced into 9 mm wide strips to obtain a bag sealing tape. The obtained bag sealing tape is a conventional one that does not have a non-adhesion zone. Evaluations of self-adhesion retention force, retention strength, and self-adhesion force were conducted by using the obtained bag sealing tape. The results are shown in Table 2. In addition, with the obtained bag sealing tape, a to-be-banded object (designed for bread manufacturers; a PP bag for six slices of bread; thickness around a neck of the bag was 32 mm) was banded by using the banding device according to Embodiment 3, and the banding was completed by cutting the bag sealing tape such that a misalignment of about 1 mm was generated between the edges of the pasted tape. A practical-use test was performed on an obtained banding body. The results are shown in Table 2.

COMPARATIVE EXAMPLE 2

Materials shown in Table 1 were mixed, and toluene was added thereto. The mixture was agitated and melted for 240 minutes at 30° C. to obtain a pressure sensitive adhesive. A base film (a PET film having a thickness of 38 μm) was coated with the obtained pressure sensitive adhesive by using a die coater such that an adhesive thickness thereon became 20 μm, was dried with heat at 80° C., and was sliced into 9 mm wide strips to obtain a bag sealing tape. In the obtained bag sealing tape, the length of an adhesion zone was 28 mm and the length of a non-adhesion zone was 37 mm. Evaluations of self-adhesion retention force, retention strength, and self-adhesion force were conducted by using the obtained bag sealing tape. The results are shown in Table 2. In addition, with the obtained bag sealing tape, a to-be-banded object (designed for bread manufacturers; a PP bag for six slices of bread; thickness around a neck of the bag was 32 mm) was banded by using the banding device according to Embodiment 3, and the banding was completed by cutting the bag sealing tape such that the length of the first non-adhesion zone was 20 mm and the length of the second non-adhesion zone was 17 mm. A practical-use test was performed on an obtained banding body. The results are shown in Table 2.

TABLE 1

|  | Example 1 Example 3 Example 6 Comparative Example 2 | Example 2 | Example 4 | Example 5 | Comparative Example 1 |
|---|---|---|---|---|---|
| Natural rubber | 15 | 25 |  | 10 | 36 |
| Quintac 3433N | 15 | 10 | 15 | 10 | 8 |
| AMERIPOL 1013N | 30 | 30 | 40 | 30 |  |
| Arkon P-100 | 5 | 5 | 5 |  | 8 |
| Arkon P-90 | 10 | 18 | 10 |  |  |
| YS RESIN PX1000 | 13 |  | 18 | 38 | 17 |
| Quintone D200 |  |  |  |  | 11 |
| Yoshinox 425 | 1 | 1 | 1 | 1 | 1 |
| Zinc white No. 3 (zinc) | 10 | 10 | 10 | 10 | 17 |
| KRONOS KA-10 (titanium oxide) | 1 | 1 | 1 | 1 | 2 |
| Total | 100 | 100 | 100 | 100 | 100 |

TABLE 2

| | Adhesion Strength Self-adhesion Retention Force [mm] | Retention Strength Shifting Distance [mm] | Peeling Strength Self-adhesion Force [n/10 mm] | Tear in Bag Determination ○ or X | Practical-use Test | | | | | |
|---|---|---|---|---|---|---|---|---|---|---|
| | | | | | Sex | Age | Band Integrity | Openability | Re-pasting Ability | Overall Evaluation |
| Example 1 | 2 min. 45 sec. | 3.0 | 4.98 | ○ | Male A | 36 | ◎ | ◎ | ◎ | ◎ |
| | | | | | Male B | 48 | ◎ | ◎ | ◎ | |
| | | | | | Female C | 60 | ◎ | ◎ | ◎ | |
| | | | | | Female D | 28 | ◎ | ◎ | ◎ | |
| Example 2 | 2 min. 42 sec. | 7.7 | 5.37 | ○ | Male A | 36 | ◎ | ◎ | ○ | ○ |
| | | | | | Male B | 48 | ○ | ◎ | ○ | |
| | | | | | Female C | 60 | ○ | ◎ | ○ | |
| | | | | | Female D | 28 | ○ | ◎ | ○ | |
| Example 3 | 2 min. 45 sec. | 3.0 | 4.98 | ○ | Male A | 36 | ◎ | ○ | ◎ | ◎ |
| | | | | | Male B | 48 | ◎ | ○ | ◎ | |
| | | | | | Female C | 60 | ◎ | ○ | ◎ | |
| | | | | | Female D | 28 | ◎ | ○ | ◎ | |
| Example 4 | 34 sec. | 10.0 | 4.12 | ○ | Male A | 36 | Δ | ◎ | ○ | Δ |
| | | | | | Male B | 48 | Δ | ◎ | ○ | |
| | | | | | Female C | 60 | X | ◎ | Δ | |
| | | | | | Female D | 28 | X | ◎ | Δ | |
| Example 5 | 12 min. 14 sec. | 1.5 | 4.51 | Δ | Male A | 36 | ◎ | ○ | ◎ | Δ |
| | | | | | Male B | 48 | ◎ | ×2 | — | |
| | | | | | Female C | 60 | ◎ | ×2 | — | |
| | | | | | Female D | 28 | ◎ | ○ | ○ | |
| Example 6 | 2 min. 45 sec. | 3.0 | 4.98 | ○ | Male A | 36 | ◎ | ○ | ○ | ◎ |
| | | | | | Male B | 48 | ◎ | ○ | ○ | |
| | | | | | Female C | 60 | ◎ | ○ | ○ | |
| | | | | | Female D | 28 | ◎ | ◎ | ◎ | |

TABLE 2-continued

| | Adhesion Strength Self-adhesion Retention Force [mm] | Retention Strength Shifting Distance [mm] | Peeling Strength Self-adhesion Force [n/10 mm] | Tear in Bag Determination ○ or X | Practical-use Test | | | | | |
|---|---|---|---|---|---|---|---|---|---|---|
| | | | | | Sex | Age | Band Integrity | Openability | Re-pasting Ability | Overall Evaluation |
| Comparative Example 1 | 3 min. 04 sec. | 1.0 | 5.0 | X | Male A | 36 | ◎ | ×1 | — | X |
| | | | | | Male B | 48 | ◎ | ×1 | — | |
| | | | | | Female C | 60 | ◎ | ×1 | — | |
| | | | | | Female D | 28 | ◎ | ×1 | — | |
| Comparative Example 2 | 2 min. 45 sec. | Banding cannot be conducted due to insufficient adhesion zone length | 4.98 | — | Male A | 36 | X | — | — | X |
| | | | | | Male B | 48 | X | — | — | |
| | | | | | Female C | 60 | X | — | — | |
| | | | | | Female D | 28 | X | — | — | |

When bread, confectioneries, vegetables, fruits fresh noodles, frozen food, etc., are placed in a to-be-banded object such as a plastic bag and the like, and when the object is banded; the bag sealing tape, and the banding device and the banding method using the bag sealing tape of the present invention can be repeatedly used without damaging the object when opening a banding body. Furthermore, since the bag sealing tape consists of materials that do not have to be separated for disposal, it is convenient when disposing the bag sealing tape.

While the invention has been described in detail, the foregoing description is in all aspects illustrative and not restrictive. It will be understood that numerous other modifications and variations can be devised without departing from the scope of the invention.

What is claimed is:

1. A coiled roll of bag sealing tape for resealably banding a bag whose opening is closed into a neck, the bag sealing tape being unwound lengthwise off the roll in use, and comprising:
   a tape-like base film, one side of the tape-like film having a surface for adhesion layers; and
   a single-rowed plurality of adhesion layers each being made of an adhesive adhered to the surface of the base film and having a length in the lengthwise direction of the base film of 40 mm to 90 mm and a width same as the width of the base film, the adhesion layers aligned lengthwise along the base film and spaced apart from each other lengthwise by non-adhesion zones where adhesive is not adhered to the base-film surface, the non-adhesion zones each having a length in the lengthwise direction of the base film of at least 10 mm and a width same as the width of the base film, wherein the bag sealing tape is self-adhesive when banded around the bag neck so as to seal the bag neck; wherein
   with the bag sealing tape adhered to itself such that one of the adhesion layers is adhered to another of the adhesion layers, reband-enabling inter-layer separation peel strength is smaller than adhesion strength between each adhesion layer and the base film,
   the peel strength, in a tension test in which a cut of the bag sealing tape in a 20-mm width is obtained, the bag sealing tape's adhesion layer is pasted to itself with one round-trip of compression bonding using a 2-kg rubber roller, the bag sealing tape 20 min post-pasting is fixed on a tension test machine, and a T-type peeling of the adhesion layers adhered to each other is performed at a tension speed of 300 mm/min, is from 3 to 5 N/10 mm, and
   the adhesion layers are each composed of at least natural rubber, styrene-isoprene-styrene copolymerization rubber, hydrogenated petroleum resin, and terpene phenolic resin, wherein the rubbers constitute a pressure sensitive adhesive and the resins are tackifiers.

2. The bag sealing tape according to claim 1, wherein lengthwise along the base film, adhesion layer length relative to non-adhesion zone length is a ratio of from 9:1 to 1:1.5.

3. The bag sealing tape according to claim 2, wherein lengthwise along the base film, adhesion layer length relative to non-adhesion zone length is a ratio of from 4:1 to 1:1.

4. The bag sealing tape according to claim 1, wherein lengthwise along the base film, a sum of the adhesion layer length and the non-adhesion zone length is 45 mm to 100 mm.

5. The bag sealing tape according to claim 4, wherein lengthwise along the base film, the sum of the adhesion layer length and the non-adhesion zone length is 70 mm to 85 mm.

6. The bag sealing tape according to claim 1, wherein in the adhesive a blend amount of a polymer containing the styrene-isoprene-styrene copolymerization rubber other than the natural rubber is 30 to 90% by weight.

* * * * *